United States Patent
Farneti

(10) Patent No.: US 9,862,510 B2
(45) Date of Patent: Jan. 9, 2018

(54) ELECTRICALLY OPERATED MACHINE FOR COVERING BOOK COVERS AND SEALING ENVELOPES AND ARTICLES OF VARIOUS KIND

(75) Inventor: Aldo Farneti, Milan (IT)

(73) Assignee: COLIBRI' SYSTEM S.P.A., Milan (IT)

(\*) Notice: Subject to any disclaimer, the term of this patent is extended or adjusted under 35 U.S.C. 154(b) by 1065 days.

(21) Appl. No.: 13/988,824

(22) PCT Filed: Nov. 22, 2011

(86) PCT No.: PCT/EP2011/070678
§ 371 (c)(1),
(2), (4) Date: Aug. 9, 2013

(87) PCT Pub. No.: WO2012/069470
PCT Pub. Date: May 31, 2012

(65) Prior Publication Data
US 2013/0326995 A1  Dec. 12, 2013

(30) Foreign Application Priority Data

Nov. 24, 2010 (IT) .............................. MI2010A2175

(51) Int. Cl.
*B65B 7/00* (2006.01)
*B29C 65/18* (2006.01)
(Continued)

(52) U.S. Cl.
CPC ................ *B65B 7/00* (2013.01); *B29C 65/18* (2013.01); *B29C 66/1122* (2013.01);
(Continued)

(58) Field of Classification Search
CPC ....... B65B 51/10; B65B 51/14; B65B 51/146; B65B 51/148
(Continued)

(56) References Cited

U.S. PATENT DOCUMENTS 3,479,485 A  11/1969 Hanna et al.
3,483,060 A  12/1969 Hu
(Continued)

FOREIGN PATENT DOCUMENTS

EP  1 598 171  11/2005
EP  1 404 528  6/2009
(Continued)

*Primary Examiner* — Hemant M Desai
*Assistant Examiner* — Valentin Neacsu
(74) *Attorney, Agent, or Firm* — Jacobson Holman, PLLC.

(57) ABSTRACT

A machine is described for covering book covers and sealing envelopes or articles of various kind. The machine comprises a fixed lower base suitable for resting a sheet of flexible plastic material for an article to be covered, an upper part movable towards said base and a heatable blade accommodated in the upper part to execute soldering of the overlapped ends of the plastic material sheet along the article edges when the upper part is approached to the lower base. The machine comprises an electric motor, a control member accessible from the outside of the machine for operating the electric motor and movement transmission means acting on the sides of the upper part to induce, at every activation of the electric motor, movement of the upper part towards the lower base for executing the soldering of the ends of the plastic material sheet.

1 Claim, 5 Drawing Sheets

(51) Int. Cl.
  *B29C 65/00* (2006.01)
  *B42C 7/00* (2006.01)
  *B43M 5/04* (2006.01)
  B29C 65/74 (2006.01)
  B29L 31/00 (2006.01)
  B65B 51/14 (2006.01)

(52) U.S. Cl.
  CPC ........ *B29C 66/431* (2013.01); *B29C 66/8161* (2013.01); *B29C 66/822* (2013.01); *B29C 66/8324* (2013.01); *B29C 66/861* (2013.01); *B42C 7/00* (2013.01); *B43M 5/04* (2013.01); *B29C 65/743* (2013.01); *B29C 65/749* (2013.01); *B29C 66/9672* (2013.01); *B29L 2031/7052* (2013.01); *B65B 51/148* (2013.01)

(58) Field of Classification Search
  USPC ........ 53/218, 219, 390, 373.4, 373.7, 374.8, 53/374.9, 375.6, 375.9; 412/3, 17
  See application file for complete search history.

(56) References Cited

U.S. PATENT DOCUMENTS

| | | | |
|---|---|---|---|
| 3,869,842 A | 3/1975 | Verbeke | |
| 4,618,520 A | 10/1986 | Holmberg | |
| 4,767,482 A * | 8/1988 | Diez | B29C 65/18 156/163 |
| 4,903,460 A * | 2/1990 | Ballestrazzi | B29C 65/02 156/512 |
| 5,437,443 A * | 8/1995 | Miyata | B65H 1/04 271/162 |
| 5,441,246 A * | 8/1995 | Miyata | B41J 13/103 271/156 |
| 5,572,829 A * | 11/1996 | Stoltenberg | E05D 15/165 160/191 |
| 5,903,120 A * | 5/1999 | Shin | D06F 39/14 220/263 |
| 7,115,086 B1 * | 10/2006 | Campbell, Jr. | B29C 65/743 493/189 |
| D550,278 S * | 9/2007 | Farneti | D18/34.1 |
| 2003/0173022 A1* | 9/2003 | Futase | B29C 65/38 156/251 |
| 2006/0153664 A1* | 7/2006 | Farneti | B29C 65/18 412/19 |
| 2006/0185797 A1* | 8/2006 | Lauzon | B29C 65/18 156/515 |
| 2007/0068632 A1* | 3/2007 | Bertram | B29C 65/7894 156/583.1 |
| 2008/0289304 A1* | 11/2008 | Matta | B29C 65/18 53/562 |
| 2009/0038273 A1* | 2/2009 | Thurgood | B29C 65/18 53/477 |
| 2009/0049805 A1* | 2/2009 | Specht | B29C 65/08 53/479 |
| 2009/0265993 A1* | 10/2009 | Shah | B60J 5/0416 49/352 |

FOREIGN PATENT DOCUMENTS

IT      EP 0908328 A1 * 4/1999 ........ B29C 65/7433
WO    WO 03/004282    1/2003

* cited by examiner

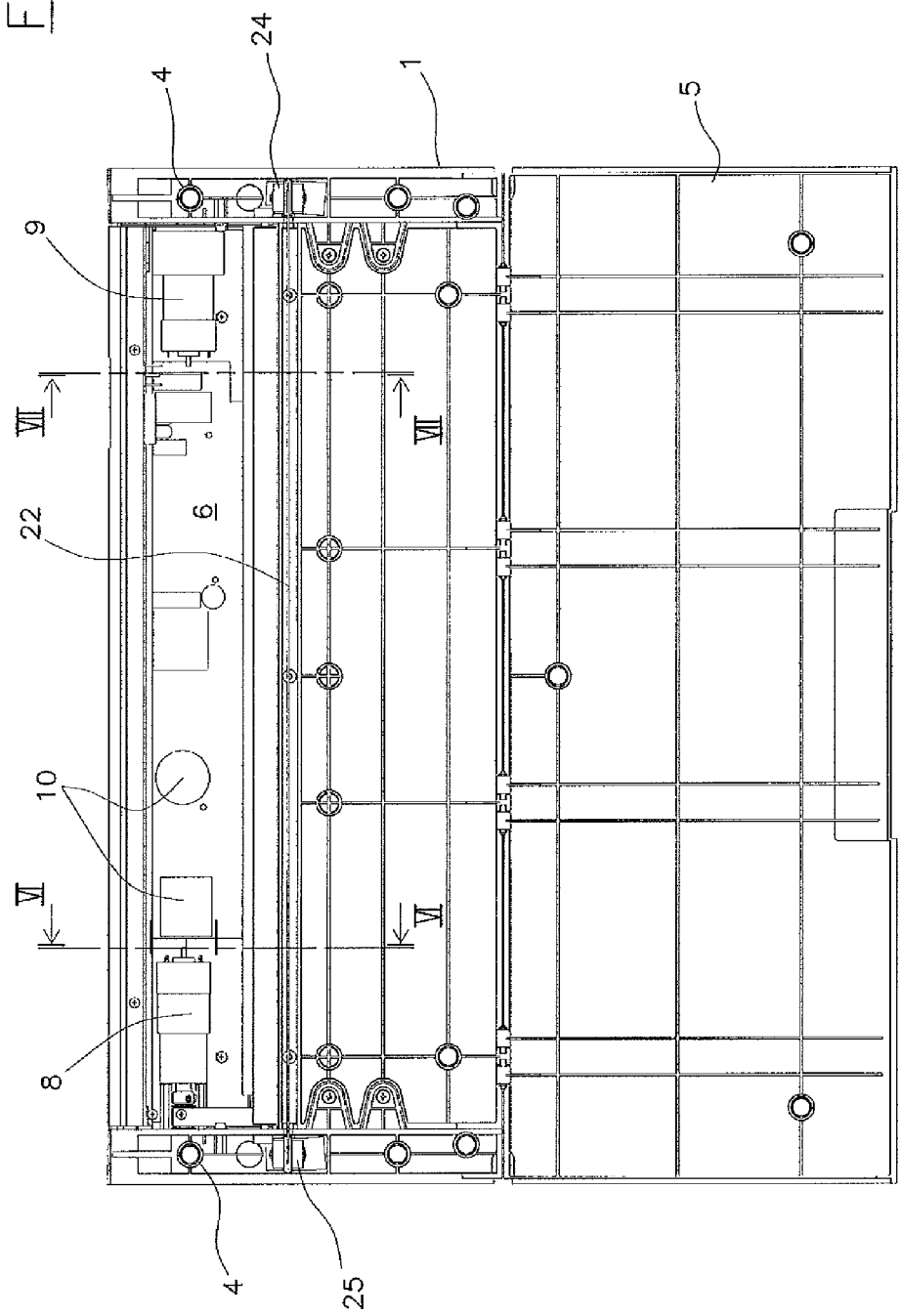

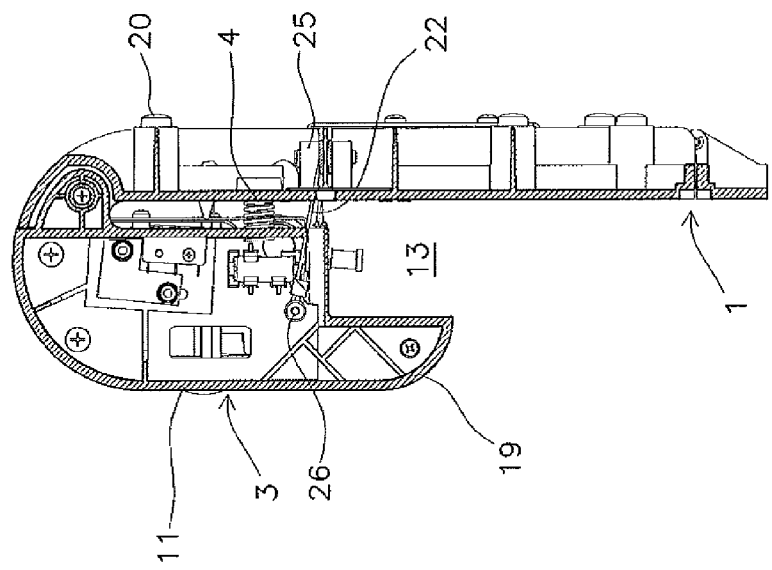
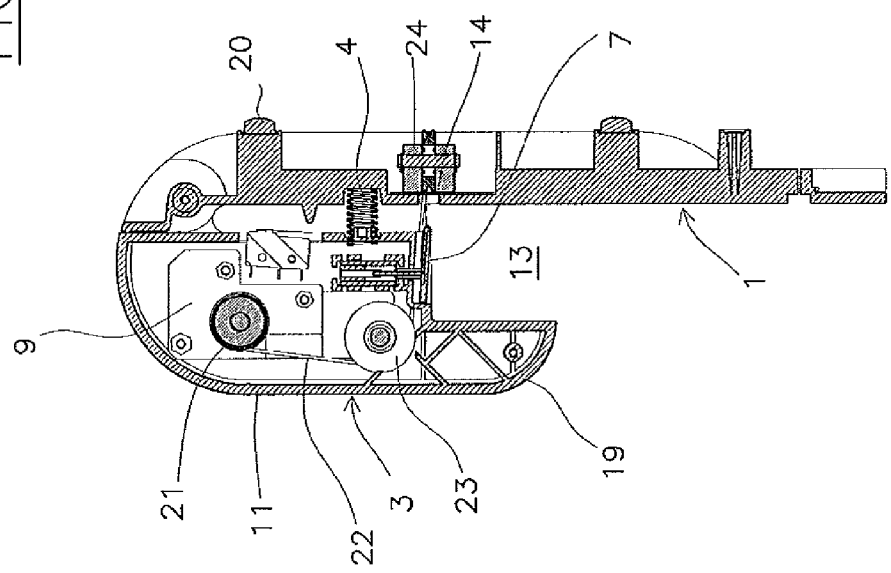

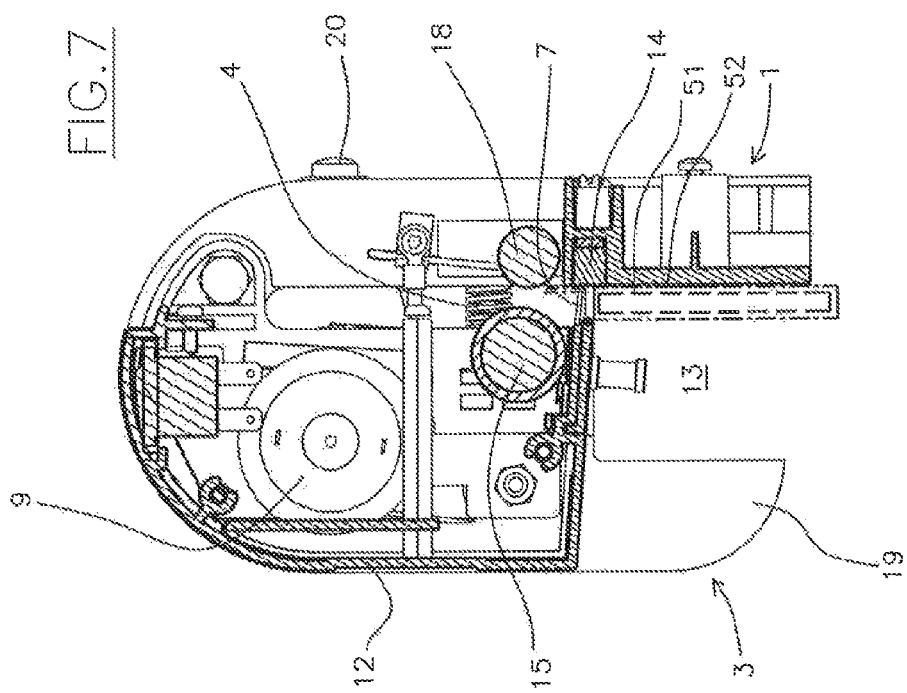
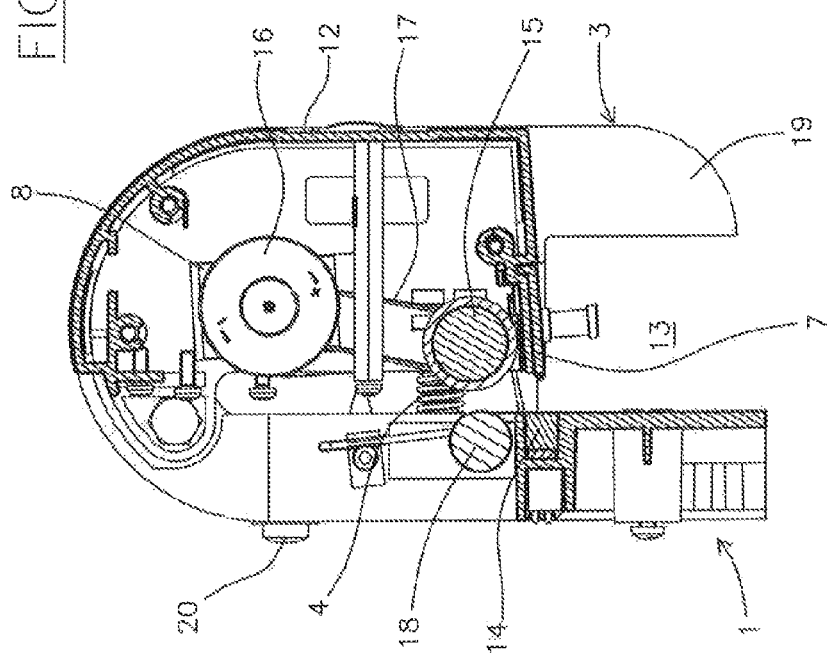

ELECTRICALLY OPERATED MACHINE FOR COVERING BOOK COVERS AND SEALING ENVELOPES AND ARTICLES OF VARIOUS KIND

This is a national stage of PCT/EP11/070678 filed Nov. 22, 2011 and published in English, which has a priority of Italian no. MI2010A002175 filed Nov. 24, 2010, hereby incorporated by reference.

The present invention relates to an electrically operated machine for covering book covers and sealing envelopes and articles of various kind.

Machines are known for making book covers and sealing envelopes by means of specific sheets of flexible plastic material, which are supplied in single piece or unwindable from a continuous roll. A machine of this kind, which is very suitable for offices, libraries, stationary shops and the like, is described in EP 1 404 528 B1 and comprises a heat soldering assembly which cooperates with a work surface. The assembly comprises a fixed lower base suitable for laying a sheet of flexible plastic material, and an upper part movable towards said base to execute, by means of an electrically heated blade, the soldering of the overlapped ends of the plastic material sheet along the edges of the book. The excess material is then removed.

In the aforesaid machine, the approaching of the upper part to the laying base is carried out manually by pressing a pair of levers applied at the ends of said upper part and holding them downwards.

This results in the operator simultaneously using both hands and the impossibility of simultaneously carrying out other movements which could be useful.

It was the object of the present invention to make a machine for covering book covers and sealing envelopes of articles of various kind, which is easy and quick to operate using one single hand, thus leaving the operator free to carry out further interventions with the other hand.

In accordance with the present invention, such an object is achieved by means of a machine comprising a fixed lower base suitable for laying a sheet of flexible plastic material, single or winding from a roll, for an article to be covered, an upper part movable towards said base and a heatable blade accommodated in said upper part to execute the soldering of the overlapped ends of the plastic material sheet along the edges of said article when said upper part is approached to said lower base, characterized in that it comprises an electric motor, a control member accessible from the outside of the machine for operating said electric motor and movement transmission means acting on the sides of said upper part to induce, at every activation of said electric motor determined by said control member, an approaching movement of said upper part towards said lower base for executing the soldering of the ends of the plastic material sheet.

Thus the operator has not to engage both hands as a simple intervention on the control member (e.g. a button or a pedal-operated member) is sufficient to obtain the wanted result.

The features and advantages of the present invention will become apparent from the following detailed description of an embodiment thereof, shown by way of non-limiting example in the accompanying drawings, in which:

FIG. 3 is a top view from below, with covers removed, of the machine in FIG. 1;

FIG. 4 is a sectional view according to line IV-IV, of the machine in FIG. 2;

FIG. 5 is a sectional view according to line V-V, of the machine 1 in FIG. 2;

FIG. 6 is a sectional view according to line VI-VI, of the machine in FIG. 3;

FIG. 7 is a sectional view according to line VII-VII, of the machine in FIG. 3;

The drawings show a machine according to the present invention, for covering books or other articles 51 with sheets of flexible plastic material 52.

Figure 1:
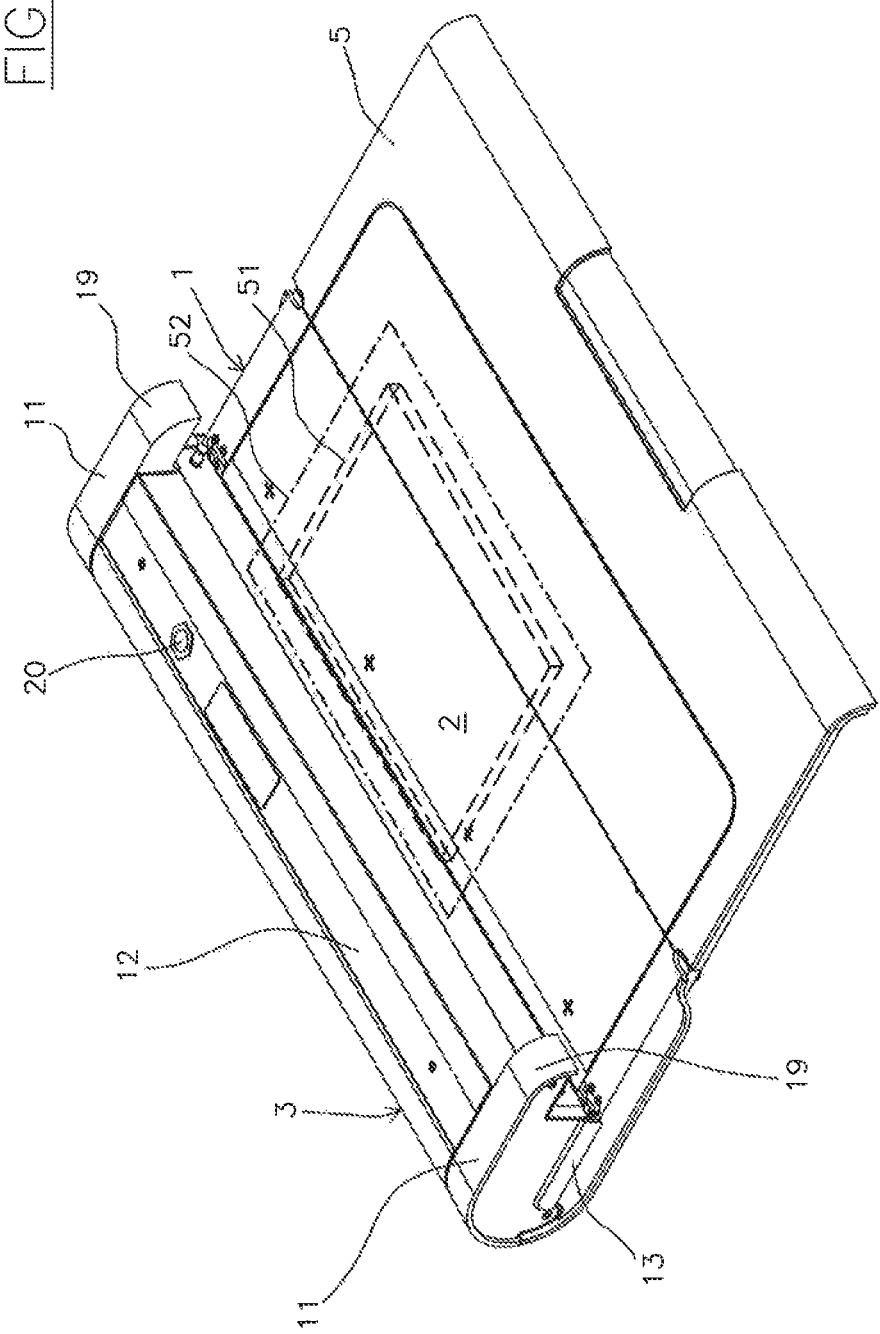
FIG. 1 is a prospective view, in resting position, of a machine for covering articles according to the present invention.
Figure 2:
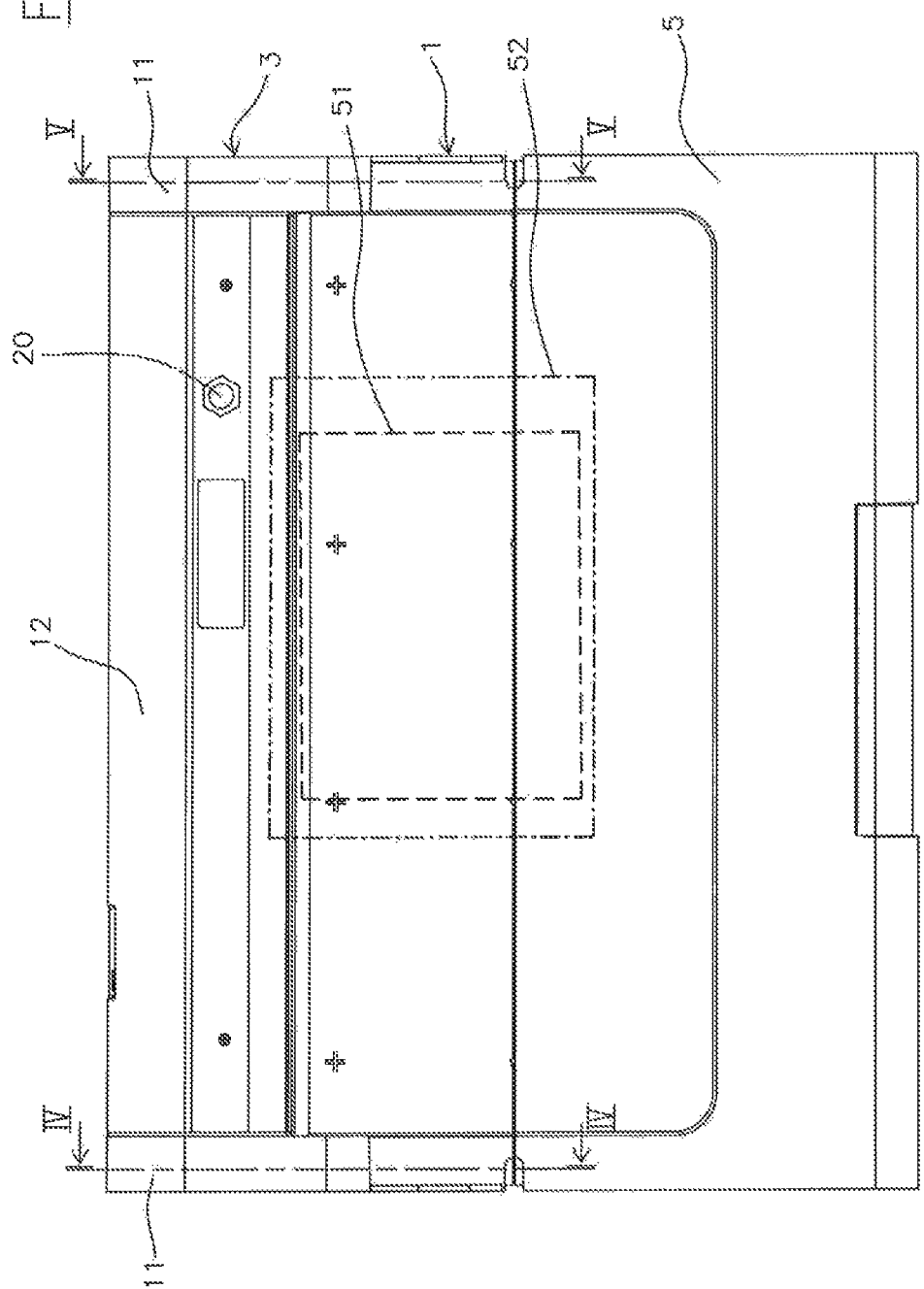
FIG. 2 is top view from above, of the machine in FIG. 1.

The machine shown in FIGS. 1, 2 and 3 comprises a lower base 1, which defines a laying surface 2 for the sheet, single or unwindable from a roll, used to cover or seal the article, and an upper part 3 movable towards said base starting from a resting position towards which it is urged by a pair of helical springs 4 interposed between respective ends of base 1 and of the upper part 3 (FIGS. 4-7).

The lower base 1 provides a foldable extension 5, which facilitates the covering operations and at the same time allows a smaller volume of the machine when it is not operating. Base 1, close to the upper part 3, also provides a receptacle 6 (FIG. 3), which is closed by a removable cover, in which two electric motors 8 and 9 and an electric circuitry 10 are accommodated.

The upper part 3 consists of two sides 11 connected by a crosspiece 12. A space 13 defined between base 1 and the upper part 3 allows introducing the plastic sheet ends to be soldered, while the article is abutted against the front of crosspiece 12.

Crosspiece 12 carries a soldering blade 7 which collaborates with a fixed counter-blade 14 restrained to base 1 and is heatable by means of an electric resistance (not shown) fed through the electric circuitry 10.

Crosspiece 12 also carries a rubber roller 15 which is rotatingly operable by the electric motor 8 by means of a movement transmission system comprising a drive wheel 16 and a belt 17. With the upper part 3 brought close to base 1, the rubber roller 15 cooperates with an idle roller 18 which is freely pivotally carried by base 1.

The approaching of the upper part 3 to base 1 may be forced by hand, by acting on the extensions 19 of the sides 11 or by pressing an electric button 20 arranged above the upper part 3 and connected to the electric circuitry 10 or again, by means of a pedal-operated control (not shown) in turn connected to the electric circuitry 10.

In the last two cases, an electric control is given to the electric motor 9, which acts on a capstan 21 arranged close to a side 11 of the upper part 3 to wind a metallic cable 22 thereon which, through an idle return 23 arranged on a side 11 of the upper part 3 and two idle returns 24 and 25 arranged at the ends of the part below base 1, attaches to a fixing point 26 of the other side 11 after having traveled the complete width of base 1 (FIGS. 3-5).

Therefore, the machine shown in the drawings operates as follows.

Once the covering or sealing sheet is arranged with the article inserted above the laying plane defined by base 1 and by extension 5, the excess sheet ends are inserted into space 13 while the article is positioned against the front of crosspiece 12. By pressing the electric button 20 (or alternatively by acting on a pedal-operated electric control), the electric circuitry 10 controls the motor 9 to operate the winding the metallic cable 22 on the capstan 21 with subsequent approaching action by the sides 11, and hence by the complete upper part 3, to the lower base 1.

Then the electrically warmed soldering blade 7 engages the counter-blade 14 with interposed excess ends of the covering sheet of the article thus inducing the soldering of the ends along the edge of the article.

Right after, with deactivated electric resistance, the electric motor 8 controls the rubber roller 15 to operate together with the cooperating roller 18 to remove the plastic sheet ends exceeding the soldering line.

The invention claimed is:

1. A machine for covering books or articles with sealing envelopes, the machine comprising a fixed lower base including a transversally arranged counter-blade, an upper part movable by rotation towards said lower base and a heatable blade transversally housed in said upper part and the heatable blade being connected with a blade heating system, the heatable blade and the blade heating system being located in the upper part, the machine further comprising an electric motor located in the upper part for moving the upper part towards the lower base, a control member for actuating said motor, said control member being accessible from outside of the machine, and a movement transmission system located in the upper part acting on opposite lateral sides of said upper part to cause, at every activation of said electric motor determined by said control member, an approaching movement of said upper part to said lower base for engaging said blade with said counter-blade, wherein said movement transmission system comprises a cable winding capstan housed at one lateral side of said upper part and driven by said electric motor and a metallic cable windable on said capstan and extending to a fixing point at an opposite lateral side of said upper part through a path including idle rollers housed in said lower base.

* * * * *